United States Patent [19]
Linker et al.

[11] 3,797,135
[45] Mar. 19, 1974

[54] SHELF DISPLAY PLANNING KIT

[75] Inventors: Edward A. Linker, Summit, N.J.; Clarence M. Lepeer, New York, N.Y.

[73] Assignee: The Chartmakers, Incorporated, New York, N.Y.

[22] Filed: July 3, 1972

[21] Appl. No.: 268,686

[52] U.S. Cl. .................... 35/53, 190/16, 281/33
[51] Int. Cl. .................................. G09b 25/00
[58] Field of Search .......... 35/53, 60; 190/1, 10, 11, 190/16, 17; 206/1.7, 1.8; 248/441, 447, 460, 467; 281/33

[56] References Cited
UNITED STATES PATENTS

| | | | |
|---|---|---|---|
| 2,147,773 | 2/1939 | Larson | 281/33 X |
| 2,646,143 | 7/1953 | Daleo | 190/16 |
| 2,890,531 | 6/1959 | Gracier | 35/53 |
| 2,941,314 | 6/1960 | Schwieger | 35/53 |

*Primary Examiner*—Harland S. Skogquist

[57] ABSTRACT

A shelf display planning kit for retail stores providing a compact means for showing simulated shelving and minaturized reproductions of articles thereon and, at the same time providing a storage compartment for such productions, a planning board bearing a shelf arrangement, and associated articles. The entire kit is easily transportable, being light and compact.

1 Claim, 5 Drawing Figures

PATENTED MAR 19 1974 3,797,135

SHELF DISPLAY PLANNING KIT

The invention relates to supports for display materials and, in particular, to shelf display planning apparatus having particular utility in setting up a mock display of retail items in stores in order to determine their most effective as well as aesthetic presentation.

As pointed out in U. S. Pat. No. 3,080,664 grocers and the like are concerned with the most effective utilization of shelf space. Efficiency in this respect largely means alloting space to competing brands in accordance with their rate of turnover. Salesmen for such brands are, on the other hand, interested in persuading the grocer to give their brands as prominent a display as possible. When confronting the grocer or the principals of a chain, it has been found that the sales representative is considerably aided in making his proposed presentation if he can show on a planning board a miniaturized representation of the grocery shelves on which his brand and those of his competitors will be displayed with reproductions of the packages of all the brands. Without interfering with store operation, the representative can thus illustrate his ideas of what he considers the best arrangement for displaying the competing items. If he obtains approval, the arrangement can be photographed for later use by store employees in effecting the actual shelf display, or the reproductions can be transferred to an acetate sheet to be used as a later guide for such purpose. Clearly, it is quite necessary that the kit be self contained whereby the planning board, the acetate sheets and the brand reproductions are all stored together in the kit and also that the entire assembly be compact and easy to transport manually. To that end the inventor contemplates a shelf planner employing dual functioning elements which serve in conjunction with storage space compartments to form a kit which is comparatively inexpensive and simple to manufacture and use.

One object of the invention is to provide an improved shelf planning kit which is self contained and arranged for convenient handling and effective use.

Other objects and advantages of the invention may be appreciated on reading the following description of one embodiment thereof which is taken in conjunction with the accompanying drawings, in which.

Figure 1:
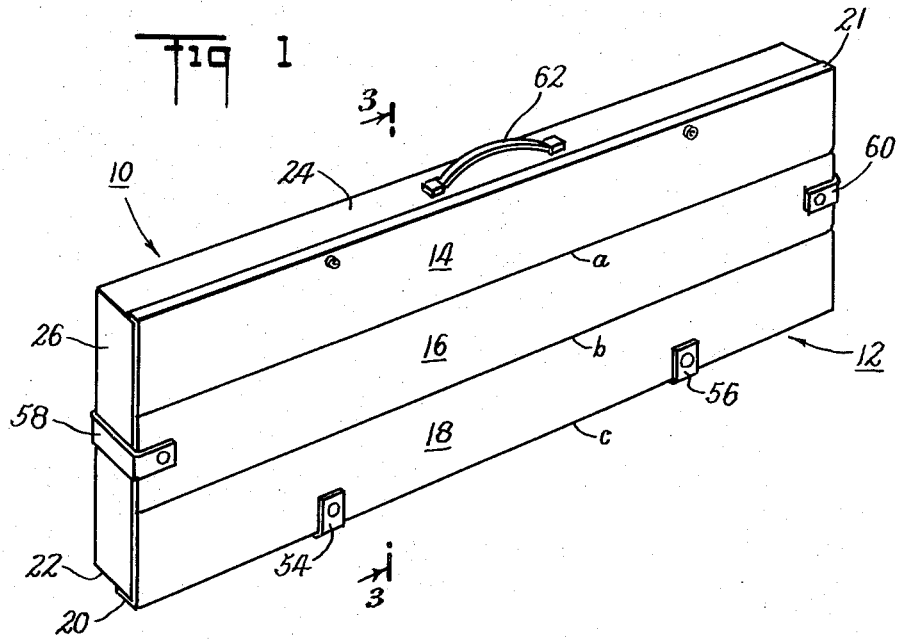
FIG. 1 is a perspective view of the closed shelf display planning kit illustrating its compact, slim line appearance.
Figure 3:
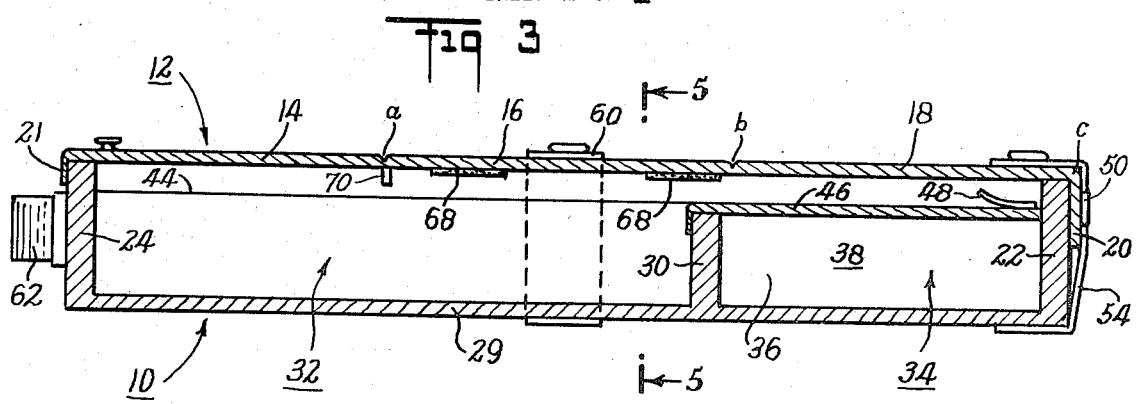
FIG. 3 is a transverse section on the line 3—3 of FIG. 1.
Figure 5:
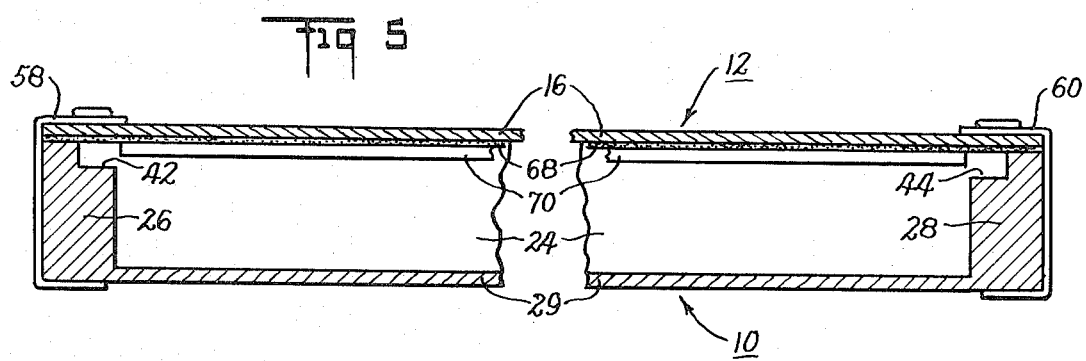
FIG. 5 is a longitudinal section taken on the line 5—5 of FIG. 3.

Referring now to the drawings, I have shown the preferred embodiment of my apparatus incorporated in a case comprising a tray portion 10 and a foldable cover 12. The latter consists of form folding sections 14, 16, 18 and 20 with contiguous sections connected on fold lines a, b and c, respectively, being attached to the tray 10 by hinge 21. As shown in the perspective view of FIG. 1 and in FIGS. 3 and 5, the cover 12 extends the full width and longitudinally the length of the tray portion 10, the two members forming an enclosed casing when the cover is in fully extended position. There is thus provided a carrying case of compact and economical construction.

The tray portion 10 of the case is comprised of a rectangular frame having front and rear walls 22 and 24 and end walls 26 and 28. Cover section 14 is hinged to rear wall 24 and in closed position opposes bottom member 29. The tray 10 is divided by longitudinal portion 30, thus forming two main storage compartments 32 and 34. Compartment 34 is further subdivided by transverse partition 36 extending from front wall 22 to the partition 30 intermediate the end walls 26 and 28 to form two smaller compartments 38 and 40. End walls 26 and 28 having inwardly directed shoulders 42 and 44, respectively, formed in the top portions thereof leaving a space between the horizontal portion of the shoulders and the cover 12 whereby easels and such may be supported over the compartments within the closed casing. The compartment 34, carrying smaller articles, may be further closed by a flap 46 having a finger piece 48 being hinged to the longitudinal partition 30.

In the closed condition, the cover 12 is secured to the tray 10 by male snaps 50, on the section 20, mating with female snaps 52 on the front wall 22 of the tray 10. To prevent accidental opening of the section 20 of the cover 12, straps 54 and 56 are provided which are secured to the bottom member 29 and snap fastened to section 18 of the cover 12. The cover is further secured to the tray 10 by end straps 58 and 60 which are secured to the bottom member 29 and by snap fasteners to section 16 of the cover 12. In its closed condition the case is carried by handle 62 attached to the rear wall 24.

Figure 2:
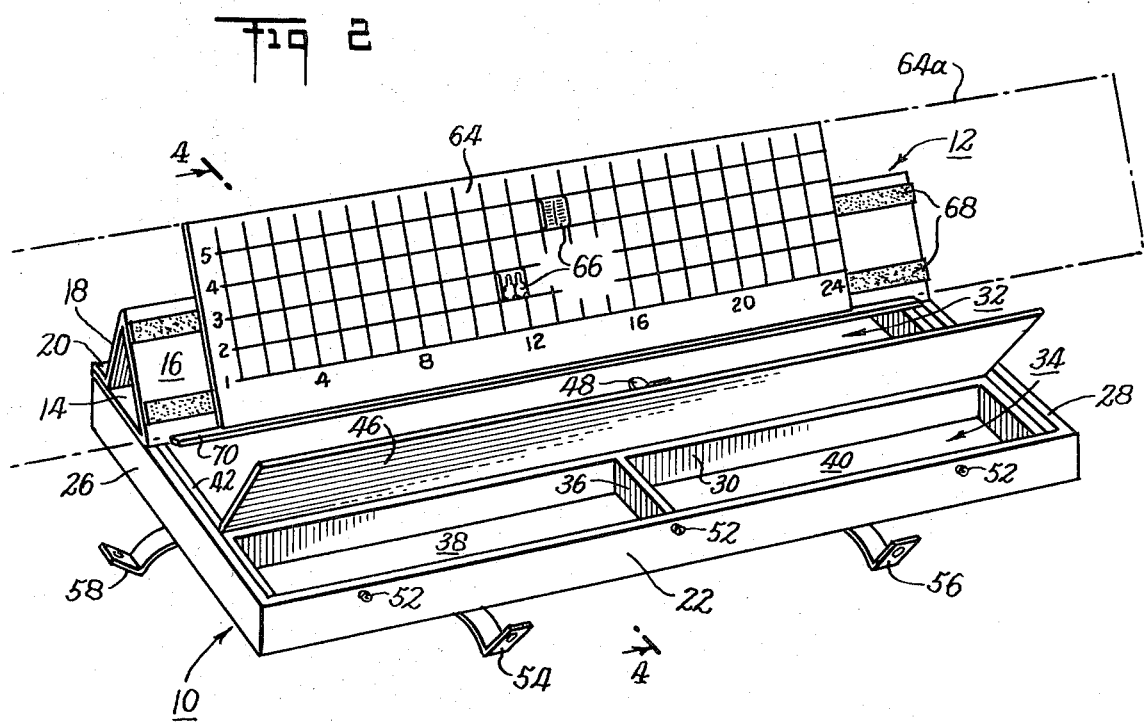
FIG. 2 is a perspective view of the planner kit, shown in FIG. 1, in open display position illustrating the convenient arrangement of the several compartments affording easy accessibility of associated parts and equipment.
Figure 4:
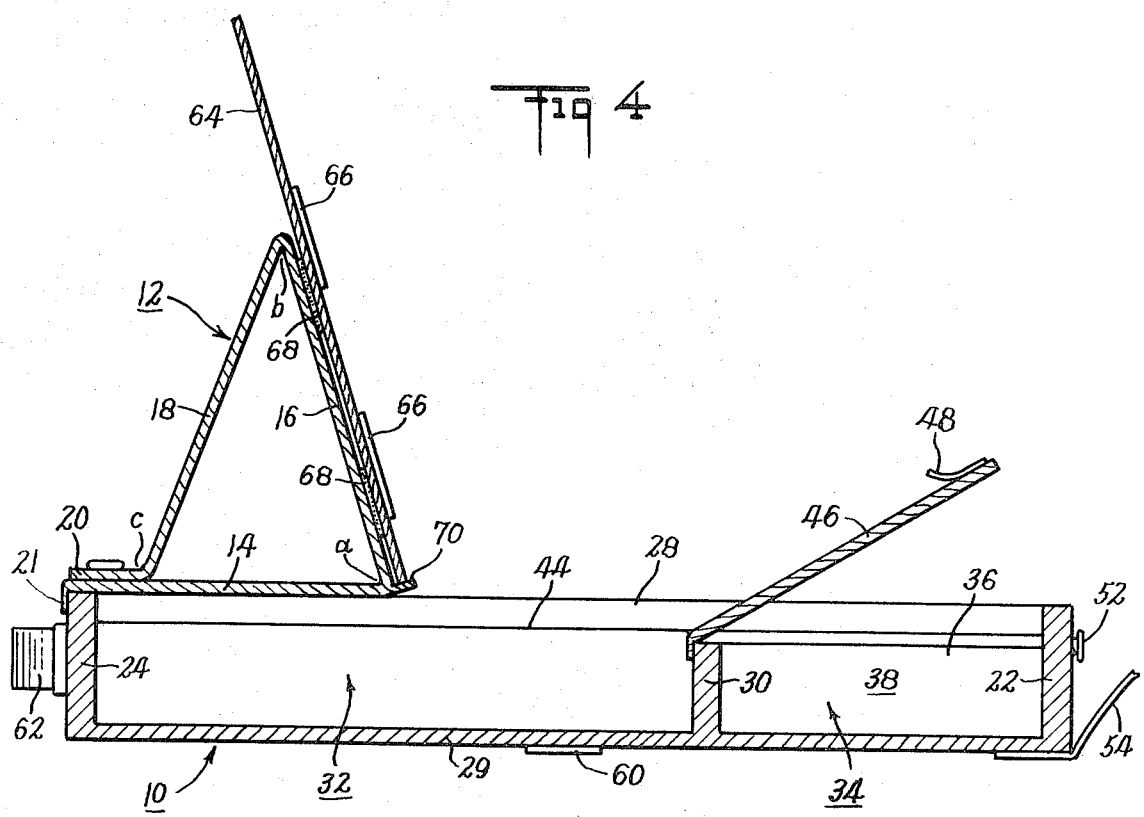
FIG. 4 is a transverse section on the line 4—4 of FIG. 2.

On opening the casing in the prescribed manner, as by folding back the several sections as shown in FIGS. 2 and 4, an easel is automatically formed, namely section 16, and locked in position when section 20 of the cover 12 is snap fastened to section 14. The length of section 14 is such that when section 20 is fastened to section 14 the section 16 is upright and leaning slightly rearwardly on fold line a to provide a support permitting good viewability thereof.

A metallic shelf planning board or easel 64 having horizontal grid lines indicating store shelving and vertical lines to aid the desired arrangement of minute reproductions 66 of containers for food and the like, as in the aforementioned patent, the easel being supported on the easel section 16 of the cover. Strips of velcro 68 on the exposed side of section 16 in open position and elongate channel 70 serve to secure the easel 64 on the open cover section 16, the easel being of any desired length in practice. If desired, the easel may be folded in the middle so that on opening into flattened position it is representative of an extra long piece of store shelving in place on folded section 16, as indicated by the dot-dash lines 64a in FIG. 2. The tray 10 may be completely exposed by simply swinging the entire cover 12 about the hinge 21.

Various modifications of the invention may be effected by persons skilled in the art without departing from the scope and principle of the invention as defined in the appended claims.

What is claimed is:

1. A combination shelf planner and material storage case comprising a storage tray having rear and front end walls, side walls connecting said end walls and a bottom member secured to said walls, a cover comprising a plurality of foldable sections, one of said cover sections being hingedly connected to the top of said rear wall, a second of said cover sections adapted to be folded into a substantially upright position, and a third of said cover sections adapted to be folded into substantially upright and supporting position for said second section, a front end wall portion adapted to overlap said front end wall when the cover is in closed position being hingedly connected to said third cover section, said front end wall portion and said first cover section having complementary fastening means, and said portion being connected to said first cover section atop the case by said fastening means for holding said second and third cover sections in substantially upright position over said bottom member.

* * * * *